(12) United States Patent
Casey et al.

(10) Patent No.: US 12,149,061 B2
(45) Date of Patent: Nov. 19, 2024

(54) SHORT CIRCUIT CABLE SUPPORT

(71) Applicant: Schneider Electric USA, Inc., Andover, MA (US)

(72) Inventors: Alex Casey, Nashville, TN (US); Bradley Hayes, Mount Juliet, TN (US)

(73) Assignee: Schneider Electric USA, Inc., Andover, MA (US)

( * ) Notice: Subject to any disclaimer, the term of this patent is extended or adjusted under 35 U.S.C. 154(b) by 0 days.

(21) Appl. No.: 17/475,707

(22) Filed: Sep. 15, 2021

(65) Prior Publication Data

US 2023/0083941 A1    Mar. 16, 2023

(51) Int. Cl.
   *H02G 3/04*    (2006.01)
(52) U.S. Cl.
   CPC ................................ *H02G 3/0456* (2013.01)
(58) Field of Classification Search
   CPC .................................................. H02G 3/0456
   USPC .......................................................... 248/135
   See application file for complete search history.

(56) References Cited

U.S. PATENT DOCUMENTS

| | | | |
|---|---|---|---|
| 3,526,934 A | 9/1970 | Owen, Sr. | |
| 3,794,370 A * | 2/1974 | Lockhart ............. | B65D 23/106 |
| | | | 215/396 |
| 4,431,152 A | 2/1984 | Reed, Jr. | |
| 5,538,208 A * | 7/1996 | Cordes .................. | F16L 3/233 |
| | | | 248/69 |
| 5,730,399 A * | 3/1998 | Baginski ............... | H02G 3/263 |
| | | | 248/68.1 |
| 5,931,423 A * | 8/1999 | Heideloff ............. | F16L 3/2235 |
| | | | 248/219.3 |
| 6,185,791 B1 | 2/2001 | Khokhar | |
| 6,783,101 B2 * | 8/2004 | Knotts .................. | F16L 3/2235 |
| | | | 248/74.1 |
| 8,511,623 B1 * | 8/2013 | Shiner, Jr. ............. | F16L 3/221 |
| | | | 248/65 |
| 8,985,532 B2 * | 3/2015 | Chirpich ............. | A01M 7/0053 |
| | | | 248/68.1 |

(Continued)

OTHER PUBLICATIONS

Catalog: Eaton Powering Business Worldwide. Online Datasheet, Switchgear cable lashing just got easier. (2021 Eaton) Retrieved from the internet at https://www.eaton.com/US/en-US/products/low-voltage-power-distribution-control-systems/switchgear-lv/accessories-and-replacement-parts-for-low-voltage-switchgear.html, internet page accessed on the date of Wednesday, Aug. 5, 2020 2:41 PM, p. 1.

*Primary Examiner* — Monica E Millner
(74) *Attorney, Agent, or Firm* — Locke Lord LLP (57) ABSTRACT

A support for a plurality of cables includes one or more cable separator beams, each with a half-cylindrically-shaped sleeve formed on each end of each beam. A sleeve on one end of each beam is configured to align with a half-cylindrically-shaped end-cap to form an enclosed cylindrical space for passage of one of the plurality of cables. The second half-cylindrically-shaped sleeve on the other end of each beam is configured to align with the corresponding second half-cylindrically-shaped sleeve on the other of the two beams to form another enclosed cylindrical space for passage of another one of the plurality of cables. An elongated flexible fastener has a locking portion on one end thereof that fastens to a tail portion on the other end thereof, configured to surround and fasten the end caps to the beams, and the beams to each other, to secure and support the plurality of cables.

4 Claims, 8 Drawing Sheets

(56) References Cited

U.S. PATENT DOCUMENTS

| | | |
|---|---|---|
| 9,548,598 B2 | 1/2017 | Tally et al. |
| 9,555,943 B2 | 1/2017 | Breen, IV et al. |
| 10,720,263 B2 | 7/2020 | O'Regan et al. |
| 10,926,929 B2 | 2/2021 | McDowell, III |
| 2003/0025048 A1* | 2/2003 | Knotts .................. F16L 3/2235 248/68.1 |
| 2005/0045786 A1* | 3/2005 | Tupper .................... A01G 9/12 248/230.1 |
| 2005/0205711 A1 | 9/2005 | Richardson |
| 2006/0090806 A1* | 5/2006 | Friedline ............... F16L 3/1075 248/62 |
| 2011/0303456 A1* | 12/2011 | Blanchard ............... F16L 3/222 248/68.1 |
| 2015/0060612 A1* | 3/2015 | Blanchard ............... H02G 3/32 248/74.3 |
| 2019/0285201 A1* | 9/2019 | Ruiz ....................... F16L 23/10 |
| 2021/0210938 A1* | 7/2021 | Guo ........................ F03D 80/85 |
| 2021/0404444 A1* | 12/2021 | Sosnenko ............ H02G 3/0456 |

* cited by examiner

SHORT CIRCUIT CABLE SUPPORT

TECHNICAL FIELD

This invention is directed generally to cable supports for a plurality of cables to prevent contact between cables during a short circuit event.

BACKGROUND

A short circuit event is possible with power distribution equipment. At higher short circuit levels, cables must be restrained to keep equipment operational following a short circuit event. The most common method of restraint is called cable lashing. Cable lashing is normally done by wrapping rope around the cables as directed by equipment manufacturers, as the cables enter and terminate in the gear. It must secure like phases of cables together while also attempting to maintain the spacing between opposing phases. This can be labor intensive for many installers of equipment.

What is needed, therefore, is a way to incorporate pre-made, fixed spaced or expandable bracing supports that are quickly secured to the cables. What is needed is bracing support assemblies that secure like phases of cables together and maintain the spacing between opposing phases.

SUMMARY

A support for a plurality of cables includes one or more cable separator beams, each with a half-cylindrically-shaped sleeve formed on each end of each beam. A sleeve on one end of each beam is configured to align with a half-cylindrically-shaped end-cap to form an enclosed cylindrical space for passage of one of the plurality of cables. The second half-cylindrically-shaped sleeve on the other end of each beam is configured to align with the corresponding second half-cylindrically-shaped sleeve on the other of the two beams to form another enclosed cylindrical space for passage of another one of the plurality of cables. An elongated fastener has a locking portion on one end thereof that fastens to a tail portion on the other end thereof, configured to surround and fasten the end caps to the beams, and the beams to each other, to secure and support the plurality of cables.

In embodiments, an assembly of one or more of the cable separator beams may be configured to support separated positions of two or more of the cables. A single cable separator beam may be used to organize and securely separate two cables, such as two separate groupings of power cables or two separate groupings of communication cables. Two or three cable separator beams may be used to organize and securely separate three or four sets of cable groupings, for example to secure like phases of cables together and maintain the spacing between opposing phases.

In accordance with one example embodiment described herein, a support for a plurality of cables prevents contact between cables during a short circuit event, comprises:
  a cable separator beam having a length along a central beam axis and respective opposite beam ends;
  first and second half-cylindrically-shaped sleeves formed on the respective opposite ends of the beam, each respective half-cylindrically-shaped sleeve having first and second sides opening outwardly from the respective beam end with a cylinder axis perpendicular to the beam axis, with each of the first and second sides of each respective half-cylindrically-shaped sleeve having a mating surface facing away from the separator beam and terminating in a plane perpendicular to the beam axis;
  a half-cylindrically-shaped end-cap having first and second sides opening outwardly, with each of the first and second sides of the half-cylindrically-shaped end-cap having a mating surface that is configured to align with a corresponding one of the mating surfaces of the first and second sides of one of the first and second half-cylindrically-shaped sleeves;
  wherein, one of the first and second half-cylindrically-shaped sleeves and the half-cylindrically-shaped end-cap form an enclosed cylindrical space for passage along the cylindrical axis of one or more cables, when the mating surfaces of the half-cylindrically-shaped end-cap substantially align with the corresponding mating surfaces of the one of the first and second half-cylindrically-shaped sleeves.

In accordance with one example embodiment described herein, the support for a plurality of cables further comprises:
  an elongated flexible fastener having a locking portion on one end thereof that fastens to a tail portion on the other end thereof, configured to surround and fasten the end cap to the sleeve by drawing the tail portion of the elongated flexible fastener through the locking portion to pull the end cap and the sleeve together in a mutually aligned and substantially abutting position.

In accordance with one example embodiment described herein, the support for a plurality of cables further comprises:
  one or more cable separator beams in an assembly configured to support separated positions of two or more cables.

In accordance with one example embodiment described herein, the support for a plurality of cables further comprises:
  a second cable separator beam having a length along a central beam axis and respective opposite beam ends;
  first and second half-cylindrically-shaped sleeves formed on respective opposite ends of the second cable separator beam, each respective half-cylindrically-shaped sleeve having first and second sides opening outwardly from the respective beam end with a cylinder axis perpendicular to the beam axis of the second cable separator beam, with each of the first and second sides of each respective half-cylindrically-shaped sleeve, having a mating surface facing away from the second cable separator beam and terminating in a plane perpendicular to the beam axis of the second cable separator beam; and
  wherein, one of the first and second half-cylindrically-shaped sleeves of the first said cable separator beam and one of the first and second half-cylindrically-shaped sleeves of the second cable separator beam form an enclosed cylindrical space for passage along a cylindrical axis of a second one of the one or more cables, when the mating surfaces of the one of the first and second half-cylindrically-shaped sleeves of the first said cable separator beam substantially align with the corresponding mating surfaces of one of the first and second half-cylindrically-shaped sleeves of the second cable separator beam.

In accordance with one example embodiment described herein, the support for a plurality of cables further comprises:
  an elongated flexible fastener having a locking portion on one end thereof that fastens to a tail portion on the other end thereof, configured to surround and fasten the one of the first and second half-cylindrically-shaped sleeves of the first said cable separator beam and one of the first and second half-cylindrically-shaped sleeves of the second cable separator beam, by drawing the tail portion of the elongated flexible fastener through the locking portion to pull the one of the first and second half-cylindrically-shaped sleeves of the first said cable separator beam and one of the first and second half-cylindrically-shaped sleeves of the second cable separator beam together in a mutually aligned and substantially abutting position.

The resulting apparatus provides support for a plurality of cables and prevents contact between cables during a short circuit event. The apparatus significantly reduces the labor required (and thus the cost) to properly restrain the cables. An additional benefit is the reduced time to commissioning once equipment arrives on site.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

DETAILED DESCRIPTION

Figure 1:
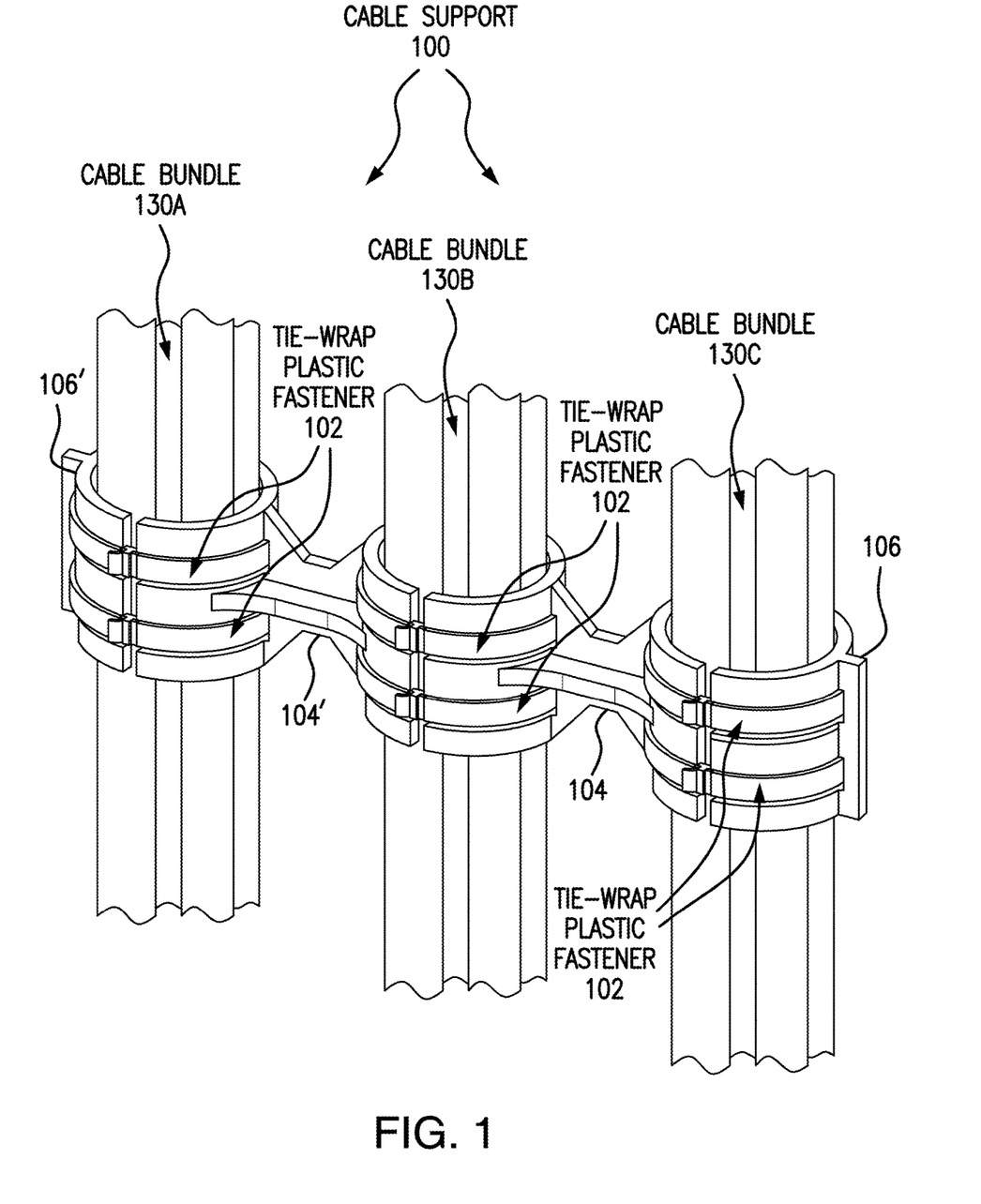
FIG. 1 is an overall, perspective view of the cable support 100, comprising two cable separator beams 104 and 104' having mating end surfaces that are configured to substantially align with each other, and two end caps 106 and 106' having mating surfaces that are configured to substantially align with end surfaces of respective cable separator beams, the cable separator beams and end caps being assembled together by elongated tie-wrap flexible fasteners 102, the assembly configured to support separated positions of three cable bundles 130A, 130B, and 130C, according to an example embodiment of the disclosure.

FIG. 1 is an overall, perspective view of the cable support 100. A cable separator beam 104 maintains separated positions of the cable groupings or bundles of like phases of power cables and maintains the spacing between opposing phases 130A, 130B, and 130C. Example fasteners, such as the elongated tie-wrap flexible fasteners 102 (FIG. 4), fasten end-caps 106 to the cable separator beam 104, which secure the cable bundles to the cable support 100. In example embodiments, the elongated tie-wrap flexible fasteners 102 may be formed from an electrically insulating material, for example a flexible plastic, such as polypropylene, or a flexible rope or cable composed of insulating woven, fibers.

Figure 2:
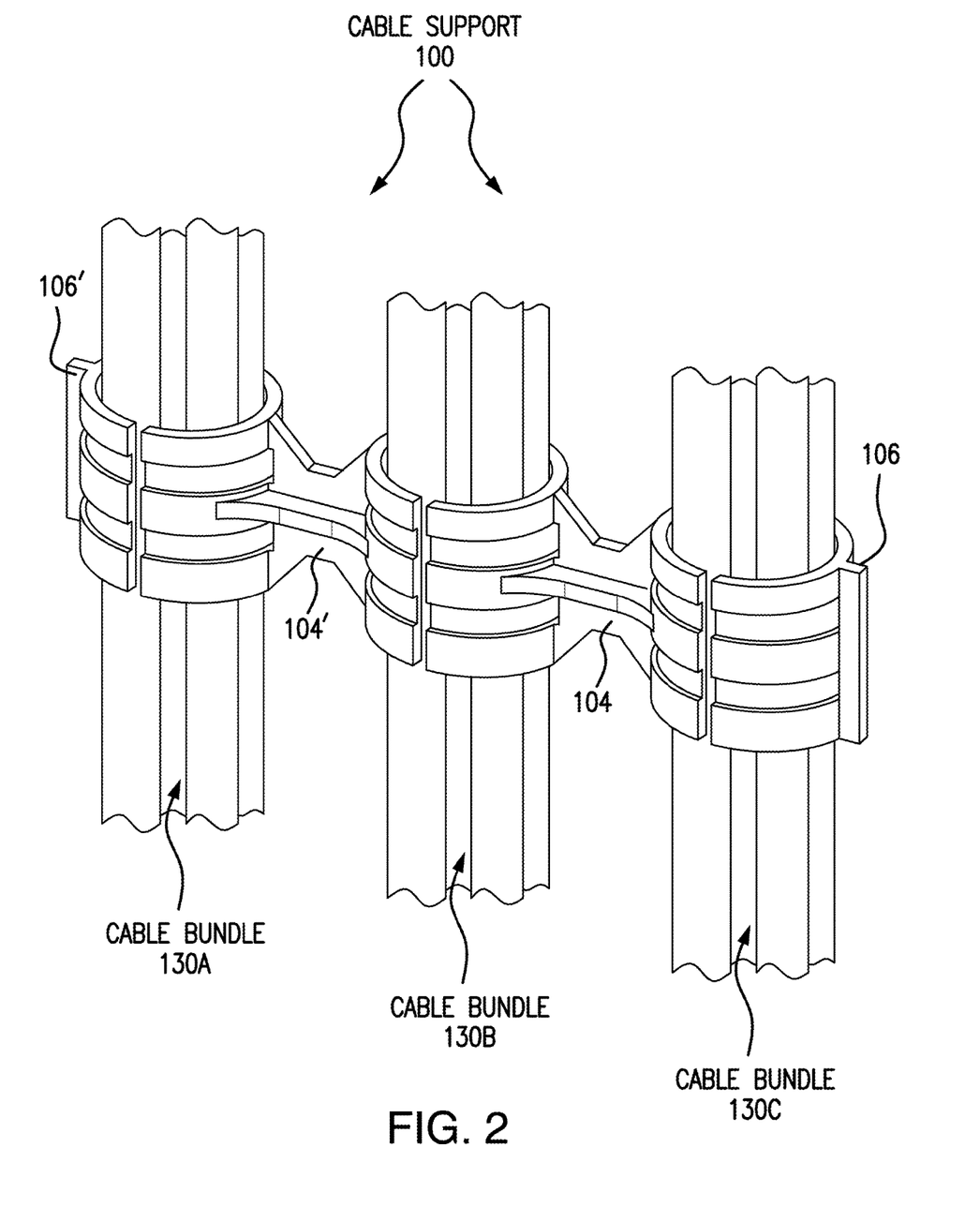
FIG. 2 is a side perspective view of the cable support with the half-cylindrically-shaped end-cap 106 with mating surfaces that are configured to substantially align with corresponding mating surfaces of the half-cylindrically-shaped sleeve 112, according to an example embodiment of the disclosure.

FIG. 2 shows the half-cylindrically-shaped end-caps 106 and 106' aligned with the of the cable separator beams 104 and 104'. In embodiments, an assembly of one or more of the cable separator beams may be configured to support separated positions of two or more of the cables. A single cable separator beam may be used to organize and securely separate two cables, such as two separate groupings of power cables or two separate groupings of communication cables. Two or three cable separator beams may be used to organize and securely separate three or four sets of cable groupings, for example to secure like phases of cables together and maintain the spacing between opposing phases.

Figure 3:
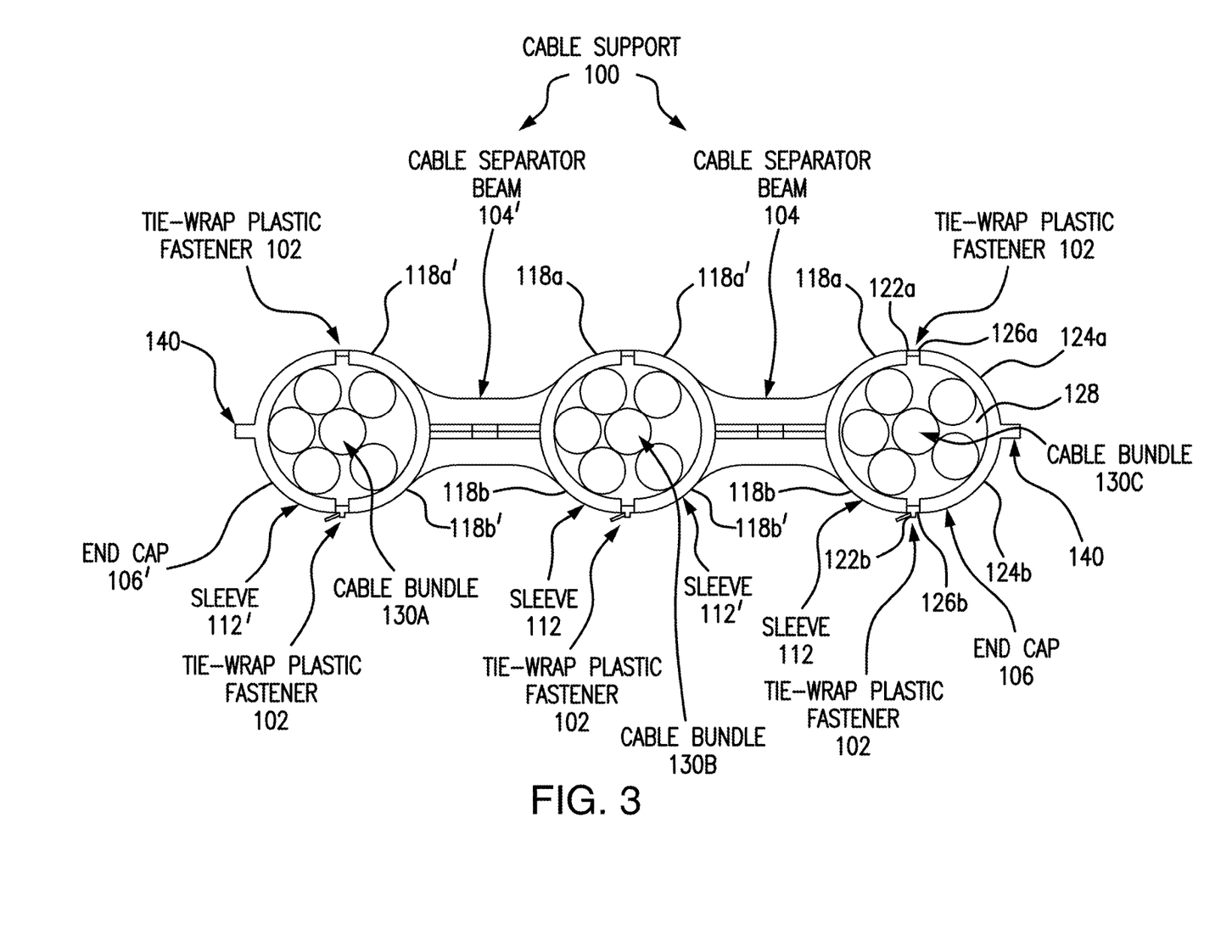
FIG. 3 is a top view of the cable support with the half-cylindrically-shaped end-caps 106 and 106' assembled with the respective half-cylindrically-shaped sleeves of the first and second cable separator beams 104 and 104', according to an example embodiment of the disclosure.
Figure 3A:
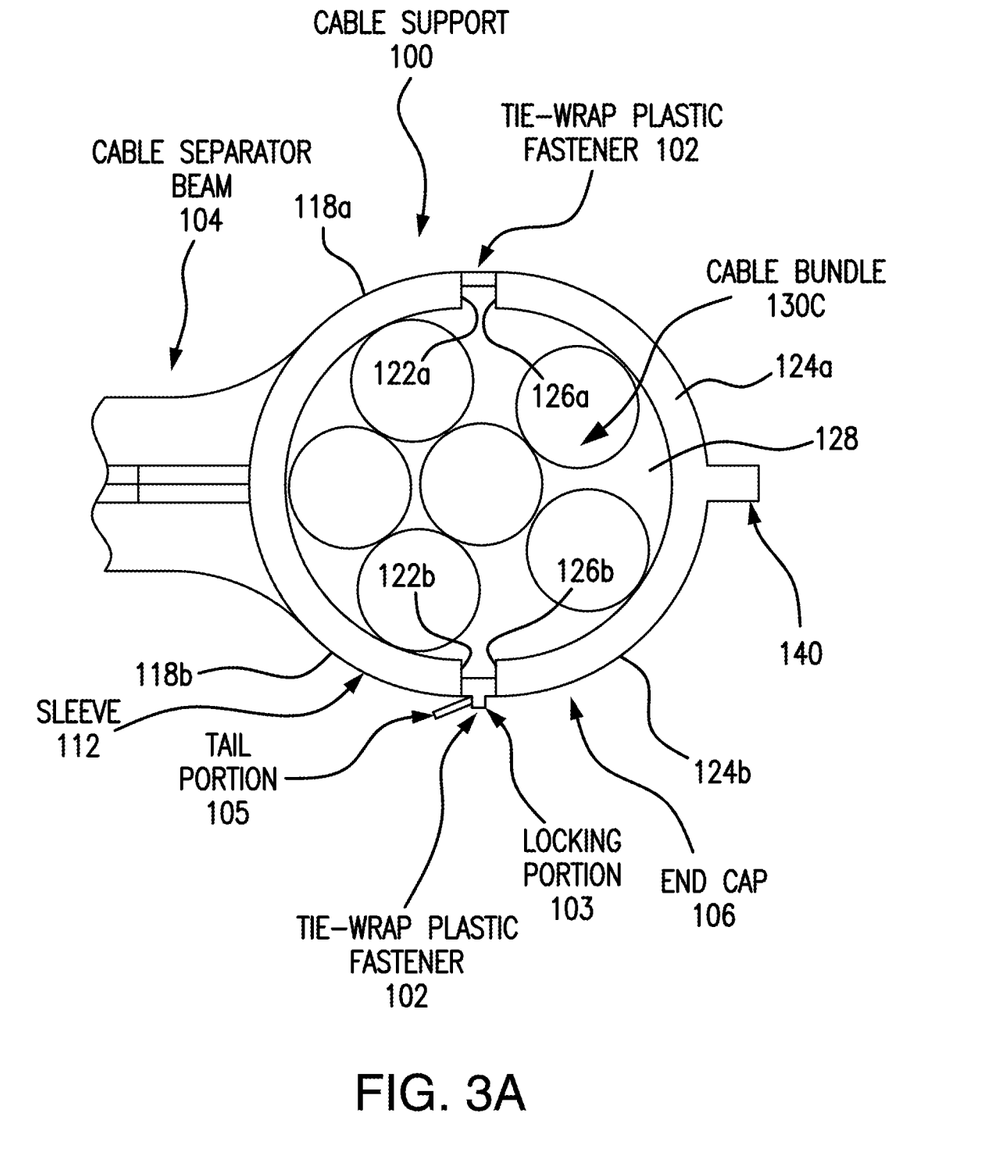
FIG. 3A is a more detailed top view in FIG. 3, of the first half-cylindrically-shaped end-cap 106 with mating surfaces that are configured to substantially align with corresponding mating surfaces of the half-cylindrically-shaped sleeve 112 of the first cable separator beam 104, according to an example embodiment of the disclosure.
Figure 3B:
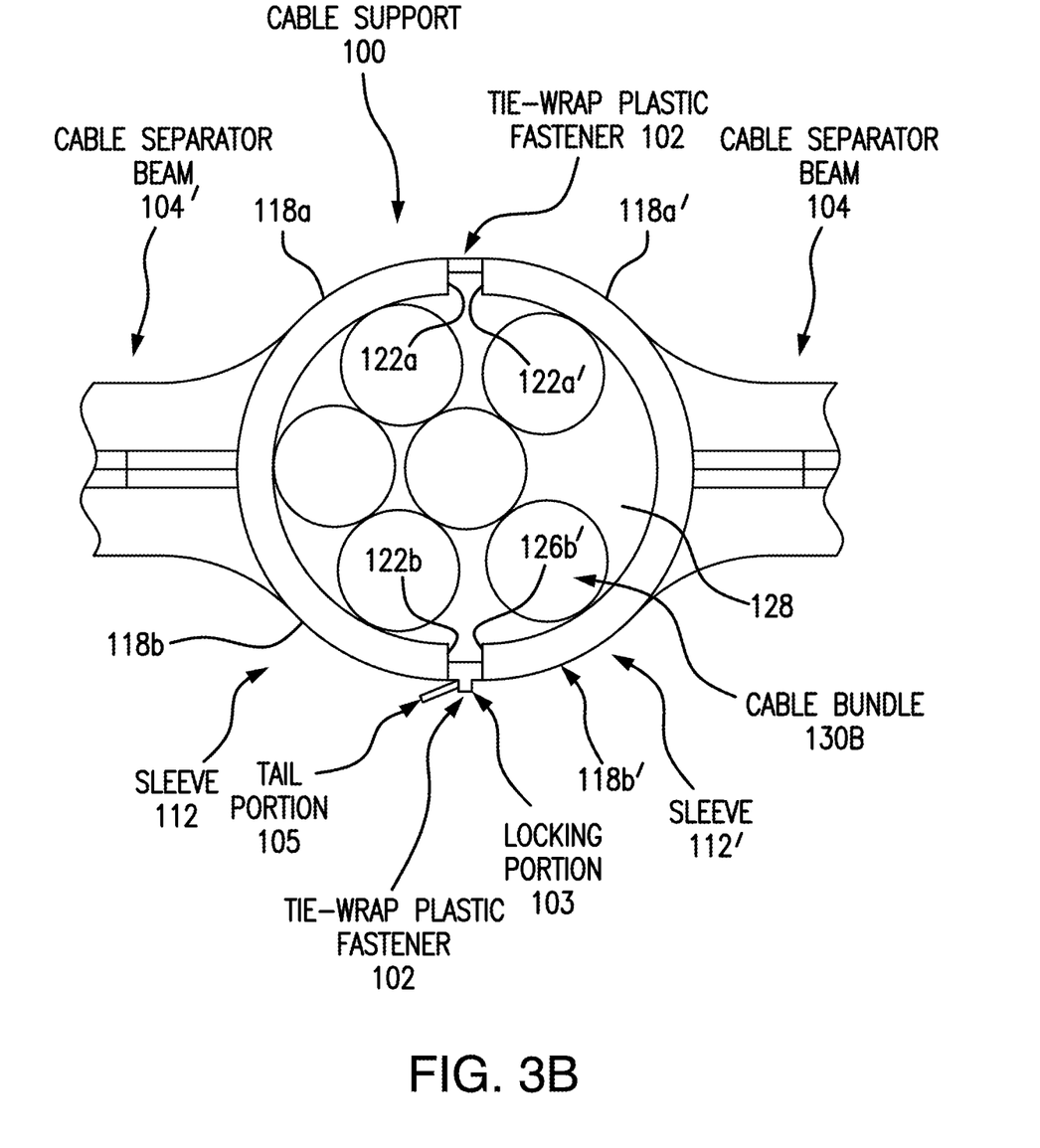
FIG. 3B is a more detailed top view in FIG. 3, of the half-cylindrically-shaped sleeve 112' of the first cable separator beam 104 with mating surfaces that are configured to substantially align with corresponding mating surfaces of the half-cylindrically-shaped sleeve 112 of the second cable separator beam 104', according to an example embodiment of the disclosure.

FIG. 3 shows the half-cylindrically-shaped end-caps 106 and 106' assembled with the respective half-cylindrically-shaped sleeves 112 and 112' of the first and second cable separator beams 104 and 104'. FIG. 3A shows the first half-cylindrically-shaped end-cap 106 with mating surfaces 126a and 126b that are configured to substantially align with corresponding mating surfaces 122a and 122b of the half-cylindrically-shaped sleeve 112 of the first cable separator beam 104. FIG. 3B shows the half-cylindrically-shaped sleeve 112' of the first cable separator beam 104 with mating surfaces 122a' and 122b' that are configured to substantially align with corresponding mating surfaces 122a and 122b of the half-cylindrically-shaped sleeve 112 of the second cable separator beam 104'.

Figure 4:
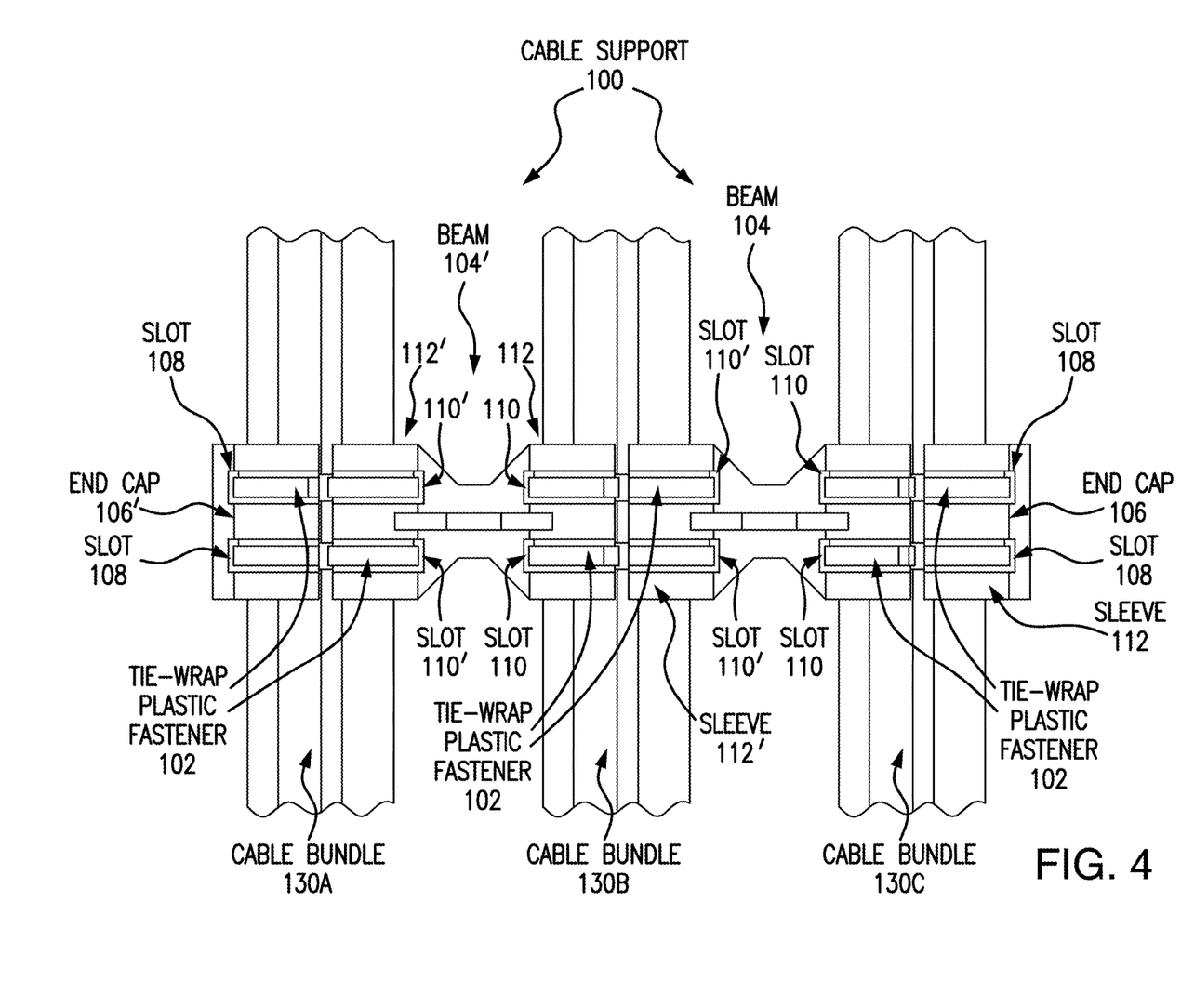
FIG. 4 is a side view of the cable support, showing the half-cylindrically-shaped end-cap 106 with mating surfaces that are configured to substantially align with corresponding mating surfaces of the half-cylindrically-shaped sleeve 112 and the example fasteners, such as the elongated tie-wrap flexible fasteners 102, configured to fasten end-caps 106 to the cable separator beam 104, which secure the cable bundles to the cable support 100, according to an example embodiment of the disclosure.

FIG. 4 shows the example fasteners, such as the elongated tie-wrap flexible fasteners 102, configured to fasten together the two cable separator beams 104 and 104', and to fasten end-caps 106 and 106' to the respective cable separator beams 104 and 104', which secure the cable bundles 130A, 130B, and 130C to the cable support 100. A non-limiting example of a structure for the tie-wrap fastener 102, is shown in U.S. Pat. No. 3,590,442, by Geisinger, for a Bundling Strap, issued Jul. 6, 1971.

Figure 5:
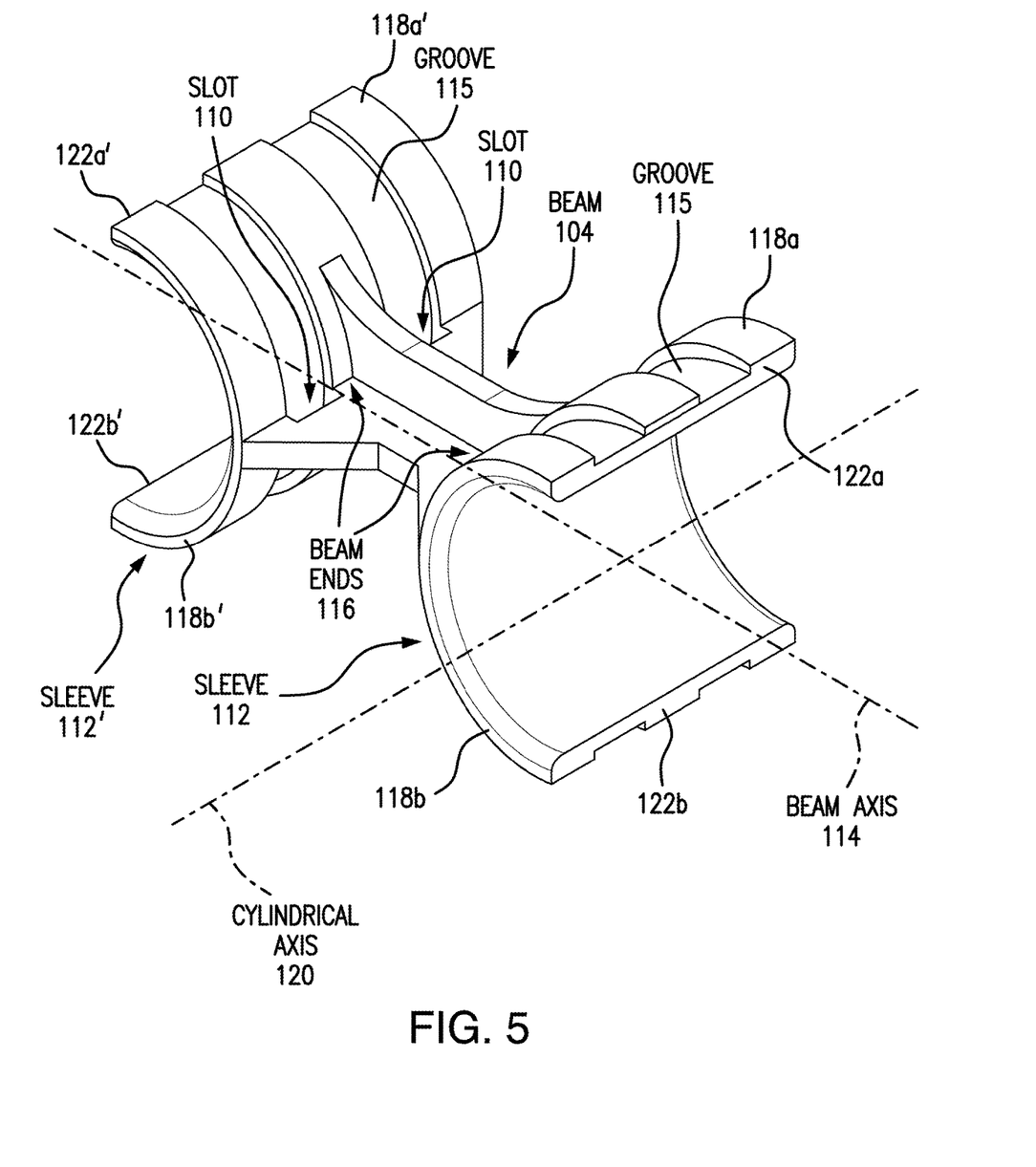
FIG. 5 is a perspective view of the cable separator beam, showing the first side 118a and second side 118b of the first half-cylindrically-shaped sleeve 112 of the first cable separator beam 104, showing respective mating surfaces 122a and 122b facing away from the cable separator beam 104 and terminating in a plane perpendicular to the beam axis 114.

FIG. 5 is a perspective view of the cable separator beam 104, showing the first side 118a and second side 118b of the first half-cylindrically-shaped sleeve 112 of the first cable separator beam 104. The figure shows respective mating surfaces 122a and 122b facing away from the cable separator beam 104 and terminating in a plane perpendicular to the beam axis 114. The cable separator beam 104 has a length along a central beam axis 114 (FIG. 5) and respective opposite beam ends 116, 116'.

In example embodiments, the cable support 100 may have different lengths of the cable separator beams 104 and 104' to accommodate a different levels of anticipated short circuit currents, with larger anticipated currents requiring greater separation between phases. In example embodiments, the cable support 100 may have adjustable length cable separator beams 104 and 104', using twist to expanded, notches and tabs. In example embodiments, the cable separator beams 104 and 104' and the end caps 106 may be formed from an electrically insulating material, for example a structural plastic such as polyvinyl chloride (PVC) or acrylonitrile butadiene styrene (ABS). In example embodiments, the end cap 106 may have a threaded insert for attaching to the side of an enclosure or a fixed mounting. In example embodiments, the elongated tie-wrap flexible fasteners 102 may be formed from an electrically insulating material, for example a flexible plastic, such as polypropylene.

A first half-cylindrically-shaped sleeve 112 is formed on the first end 116 of the beam 104 (FIG. 5) and a second half-cylindrically-shaped sleeve 112' is formed on the opposite, second end 116' of the beam 104 (FIG. 5). Each respective half-cylindrically-shaped sleeve 112, 112' has a first side 118a, 118a' and a second side 118b, 118b' opening outwardly from the beam end 116, 116', with a cylinder axis 120 perpendicular to the beam axis 114 (FIG. 5).

The first side 118a and second side 118b of the first half-cylindrically-shaped sleeve 112 have respective mating surfaces 122a and 122b facing away from the cable separator beam 104 and terminating in a plane perpendicular to the beam axis 114 (FIG. 5).

The first side 118a' and the second side 118b' of the second half-cylindrically-shaped sleeve 112' have respective mating surfaces 122a' and 122b' facing away from the cable separator beam 104 and terminating in a plane perpendicular to the beam axis 114 (FIG. 5).

A half-cylindrically-shaped end-cap 106 has a first side 124a and a second side 124b opening outwardly (FIG. 3). The first side 124a and the second side 124b of the half-cylindrically-shaped end-cap 106 have respective mating surfaces 126a and 126b that are configured to substantially align with corresponding mating surfaces 122a and 122b of the first side 118a and the second side 118b of the first half-cylindrically-shaped sleeve 112 (FIG. 3).

The first half-cylindrically-shaped sleeve 112 and the half-cylindrically-shaped end-cap 106 form an enclosed cylindrical space 128 (FIG. 3) for passage along the cylindrical axis 120 of one or more cables 130A, when the mating surfaces 126a and 126b of the half-cylindrically-shaped end-cap 106 substantially align with the corresponding mating surfaces 122a and 122b of the first half-cylindrically-shaped sleeve 112.

The elongated tie-wrap flexible fasteners 102 pass through the slot 108 (FIG. 3) in the end cap 106. The tie-wrap flexible fasteners 102 are configured to fasten the end cap 106 to the cable separator beam 104 by wrapping around the sleeve 112, lying in the groove 115 (FIG. 5), and passing through the slot 110 in the cable separator beam 104, to thereby fasten the end cap 106 to the cable separator beam 104. The tie-wrap flexible fasteners 102 have a locking portion on one end thereof that fastens to a tail portion on the other end thereof. By drawing the tail portion through the locking portion, the tie-wrap flexible fastener 102 tightens around the end cap 106 and the sleeve 112, pulling them together in a mutually aligned and substantially abutting position (FIG. 3). The end cap 106' may be fastened to the cable separator beam 104' in the same manner. In example embodiments, the cable support 100 may have more than two slots 108 and 110 to add more tie-wrap flexible fasteners 102.

The elongated tie-wrap flexible fasteners 102 are configured to fasten together the two cable separator beams 104 and 104' in a similar manner. The tie-wrap flexible fasteners 102 pass through the slot 110' (FIG. 3) in the sleeve 112' of the cable separator beam 104. The tie-wrap flexible fasteners 102 are configured to fasten the sleeve 112' of the cable separator beam 104 to the sleeve 112 of the cable separator beam 104' by wrapping around the sleeve 112', lying in the groove 115 (FIG. 5), and passing through the slot 110 in the cable separator beam 104', to thereby fasten the cable separator beam 104 to the cable separator beam 104'. The tie-wrap flexible fasteners 102 locking portion on one end thereof fastens to the tail portion on the other end thereof. By drawing the tail portion through the locking portion, the tie-wrap flexible fastener 102 tightens around the sleeve 112 and the sleeve 112', pulling the cable separator beams 104 and 104' them together in a mutually aligned and substantially abutting position (FIG. 3), which secure the cable bundles 130A, 130B, and 130C to the cable support 100.

In example embodiments, the cable support 100 may have alternate connectors to attach the end caps 106 to the cable separator beams 104 and 104'. For example, a hook and latch may be located on one side of the end cap 106 aligned with a wire tie or fastener on the cable separator beams 104 and 104'. As other examples, a slide and lock, snap and lock, or pin and lock may be used as an alternate way to attach the end caps 106 to the cable separator beams 104 and 104'.

Figures 6A, 6B, 6C:
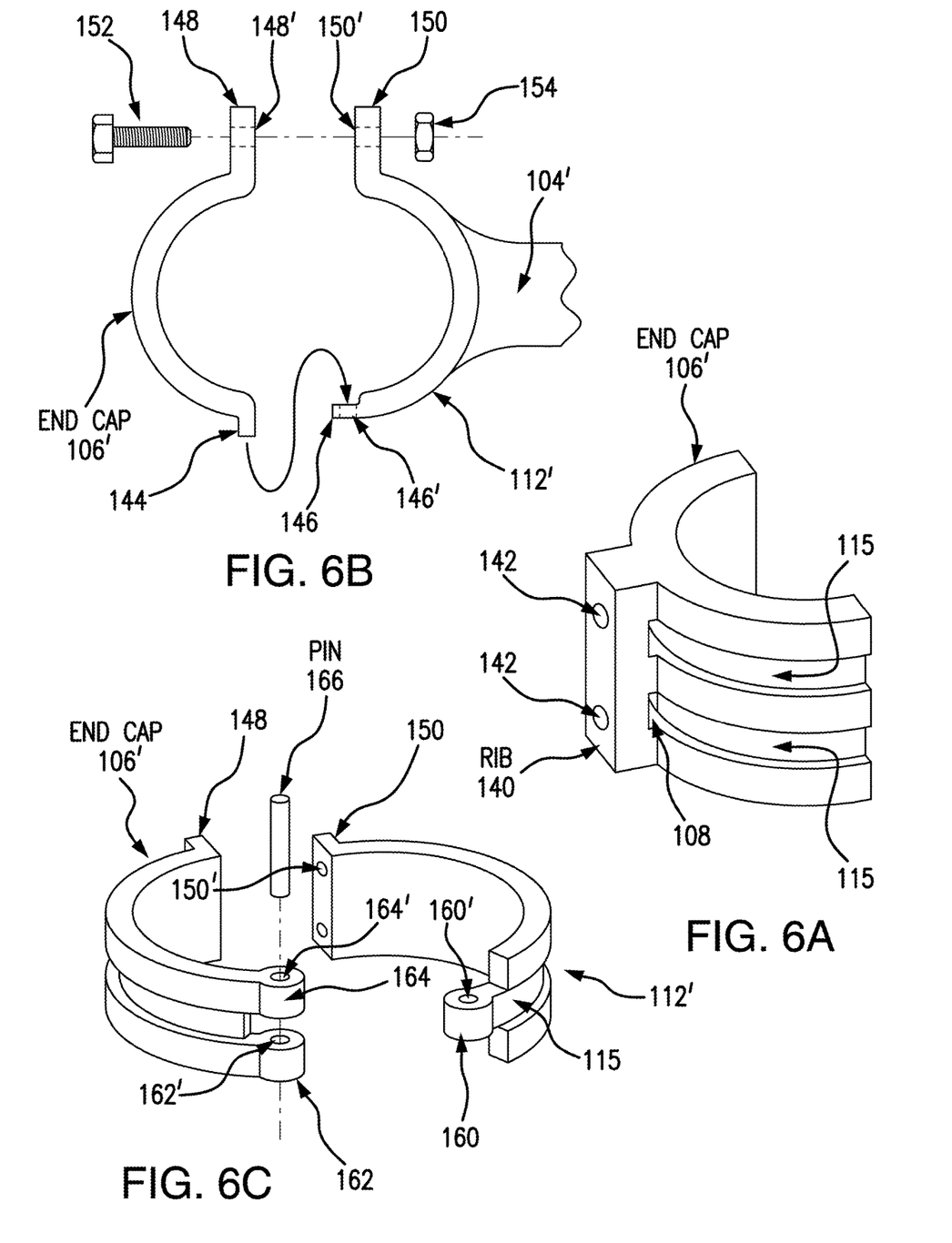
FIG. 6A is a perspective view of an alternate embodiment of the end cap 106', showing a rib 140 with threaded inserts 142 for mounting on a structural support, according to an example embodiment of the disclosure.
FIG. 6B is a top view of an alternate embodiment of the end cap 106' and the second cable separator beam 104', showing a hook and latch 144, 146 to fasten the end cap to the beam, and a second latch 148, 150 with a screw fastener 152, 154 to fasten the end cap to the beam, according to an example embodiment of the disclosure.
FIG. 6C is a perspective view of an alternate embodiment of the end cap 106' and the sleeve 112' portion of the second cable separator beam 104', showing a pin 166 and lock 160, 162, and 164 to fasten the end cap to the sleeve 112' portion of the beam, according to an example embodiment of the disclosure.

FIG. 6A is a perspective view of an alternate embodiment of the end cap 106', showing a rib 140 with threaded inserts 142 for mounting on a fixed structural support, according to an example embodiment of the disclosure. The rib structure 140 on the half-cylindrically-shaped end-cap 106', has threaded inserts 142 for mounting the half-cylindrically-shaped end-cap 106' by means of threaded screws on the fixed structural support. Other types of fastening structures may be used as a substitute for the threaded inserts 142 for mounting on a fixed mounting structure. For example, a sliding dovetail joint may be used to fasten the rib structure 140 to the fixed mounting structure. The vertically oriented rib structure 140 shown in the figure may be formed to be a trapezoidal dove-tail shaped projection in a horizontal cross-section, configured to slide vertically into a vertically oriented slot in a fixed mounting structure, the slot having a corresponding hollow trapezoidal shape in a horizontal cross-section. The sliding dovetails are assembled by sliding the rib into the slot. The sliding dovetail joint enables the half-cylindrically-shaped end-cap 106' to be fastened to the fixed mounting structure without additional fastening hardware.

FIG. 6B is a top view of an alternate embodiment of the end cap 106' and the second cable separator beam 104', showing a hook and latch 144, 146 to fasten the end cap to the beam, and a second latch 148, 150 with a screw fastener 152, 154 to fasten the end cap to the beam, according to an example embodiment of the disclosure. The hook portion 144 on the half-cylindrically-shaped end-cap 106' fits into the hole 146' in the latch structure 146 on one of the first and second half-cylindrically-shaped sleeves 112' of the cable separator beam 104', which are configured to fasten the half-cylindrically-shaped end-cap 106' to the one of the first and second half-cylindrically-shaped sleeves 112' of the cable separator beam 104'.

Another first latch structure 148, 148' on the half-cylindrically-shaped end-cap 106' fastens to a second latch structure 150, 150' on the one of the first and second half-cylindrically-shaped sleeves 112' of the cable separator beam 104'. A threaded bolt 152 fits through a hole 148' of the another first latch structure 148 and through a hole 150' of the second latch structure 150, which is fastened by the threaded nut 154 on the bolt 152. The another first latch structure 148 is fastened to the second latch structure 150 by the bolt 152 and nut 154, which fastens the half-cylindrically-shaped end-cap 106' to the one of the first and second half-cylindrically-shaped sleeves 112' of the cable separator beam 104. The bolt 152 and nut 154 may be composed of a metal, such as steel, or alternately may be composed of a structural plastic, such as polyvinyl chloride (PVC) or acrylonitrile butadiene styrene (ABS).

FIG. 6C is a perspective view of an alternate embodiment of the end cap 106' and the sleeve 112' portion of the second cable separator beam 104', showing a pin 166 and lock 160, 162, and 164 to fasten the end cap to the sleeve 112' portion of the beam, according to an example embodiment of the disclosure. A first lock structure on the half-cylindrically-shaped end-cap comprises a first socket portion 162 extending from the end-cap 106' perforated with a first axial hole 162' and a second socket portion 164 extending from the end-cap 106' perforated with a second axial hole 164', the first and second axial holes 162' and 164' being coaxial with one another. A second lock structure on the one of the first and second half-cylindrically-shaped sleeves 112' of the cable separator beam comprises a third socket portion 160 extending from the sleeve 112' portion of the beam perforated with a third axial hole 160'. The first and second lock structures are configured to be fastened together by interlocking the third socket portion 160 together with first and second socket portions 162 and 163 so that the third axial hole 160' is coaxial with the first and second axial holes 162' and 164'. In this manner, a straight pin 166, such as a cotter pin, may be passed through the three aligned coaxial holes 160', 162' and 164'. The pin 166 passes through each of the first lock structure and the second lock structure, to fasten the half-cylindrically-shaped end-cap 106' to the one of the first and second half-cylindrically-shaped sleeves 112' of the cable separator beam 104'.

Another first latch structure 148, 148' on the half-cylindrically-shaped end-cap 106' fastens to a another second latch structure 150, 150' on the one of the first and second half-cylindrically-shaped sleeves 112' of the cable separator beam 104' in FIG. 6C. A threaded bolt 152 fits through a hole 148' of the another first latch structure 148 and through a hole 150' of the another second latch structure 150, which is fastened by the threaded nut 154 on the bolt 152. The another first latch structure 148 is fastened to the another second latch structure 150 by the bolt 152 and nut 154, which fastens the half-cylindrically-shaped end-cap 106' to the one of the first and second half-cylindrically-shaped sleeves 112' of the cable separator beam 104.

In alternate embodiments, the first and second lock structures may be fastened together by more than the three interlocking socket portions 160, 162 and 163 in FIG. 6C. The three interlocking socket portions 160, 162 and 163 may be configured to snap together, so that no pin 166 is required. The first and second lock structures may be fastened together with wire ties.

In alternate embodiments, the first and second lock structures in FIG. 6C may be fastened together by a sliding dovetail joint. The half-cylindrically-shaped end-cap 106' has a first side 124*a* and a second side 124*b* opening outwardly (see FIGS. 3, 3A, and 3B). The first side 124*a* and the second side 124*b* of the half-cylindrically-shaped end-cap 106' have respective mating surfaces 126*a* and 126*b* that are configured to substantially align with corresponding mating surfaces 122*a* and 122*b* of the first side 118*a* and the second side 118*b* of the first half-cylindrically-shaped sleeve 112' (see FIGS. 3, 3A, and 3B). The mating surfaces 126*a* and 126*b* of the half-cylindrically-shaped end-cap 106' may be formed to be a trapezoidal dove-tail shaped projection configured to slide into a slots in corresponding mating surfaces 122*a* and 122*b* of the first half-cylindrically-shaped sleeve 112', the slots having a corresponding hollow trapezoidal shape. The sliding dovetails are assembled by sliding the dove-tail shaped projection of the half-cylindrically-shaped end-cap 106' into the slots in the corresponding half-cylindrically-shaped sleeve 112'. The sliding dovetail joint enables the half-cylindrically-shaped end-cap 106' to be fastened to the half-cylindrically-shaped sleeve 112' without additional fastening hardware.

The resulting apparatus provides support for a plurality of cables and prevents contact between cables during a short circuit event. The apparatus significantly reduces the labor required (and thus the cost) to properly restrain the cables. An additional benefit is the reduced time to commissioning once equipment arrives on site.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A support for a plurality of cables, comprising:
   a cable separator beam having a length along a central beam axis and respective opposite beam ends;
   first and second half-cylindrically-shaped sleeves formed integrally with the cable separator beam on respective opposite ends of the cable separator beam, each respective half-cylindrically-shaped sleeve having first and second sides opening outwardly from the respective beam end with a cylinder axis perpendicular to the beam axis, with each of the first and second sides of each respective half-cylindrically-shaped sleeve having a mating surface facing away from the separator beam and terminating in a plane perpendicular to the beam axis;
   a half-cylindrically-shaped end-cap having first and second sides opening outwardly, with each of the first and second sides of the half-cylindrically-shaped end-cap having a mating surface that is configured to align with a corresponding one of the mating surfaces of the first and second sides of one of the first and second half-cylindrically-shaped sleeves; and
   wherein, one of the first and second half-cylindrically-shaped sleeves and the half-cylindrically-shaped end-cap form an enclosed cylindrical space for passage along the cylindrical axis of one or more cables, when the mating surfaces of the half-cylindrically-shaped end-cap substantially align with the corresponding mating surfaces of the one of the first and second half-cylindrically-shaped sleeves, wherein each of the first and second half-cylindrically-shaped sleeves include one or more sleeve grooves formed on an outer surface thereof, and the cable separator beam includes one or more slots defined therethrough at the one or more sleeve grooves, wherein the one or more sleeve grooves are configured to receive a flexible fastener therein, and wherein the one or more slots are configured to allow the flexible fastener in a respective groove to pass through a respective slot.

2. The support for a plurality of cables of claim 1, wherein the half-cylindrically-shaped end-cap defines one or more complimentary end cap grooves formed on an outer surface thereof and configured to align with the one or more sleeve grooves, wherein the one or more end cap grooves are configured to receive the flexible fastener.

3. The support for a plurality of cables of claim 2, wherein the end cap includes an end cap slot structure defining one or more end cap slots configured to allow the flexible fastener to pass therethrough.

4. The support for a plurality of cables of claim 3, wherein the half-cylindrically-shaped sleeves and the end cap are configured to allow a flexible fastener to pass through the one or more end cap slots, fasten the end cap to the cable separator beam by wrapping around the respective half-cylindrically-shaped sleeve lying in the sleeve groove and the end cap groove, and pass through the slot in the cable separator beam to thereby fasten the end cap to the cable separator beam.

* * * * *